United States Patent

Peck

(10) Patent No.: US 6,595,464 B2
(45) Date of Patent: Jul. 22, 2003

(54) RETRACTABLE HOSE GUIDE

(76) Inventor: Brian D. Peck, 17912 River Cir. #5, Canyon Country, CA (US) 91387

( * ) Notice: Subject to any disclaimer, the term of this patent is extended or adjusted under 35 U.S.C. 154(b) by 15 days.

(21) Appl. No.: 09/935,941

(22) Filed: Aug. 23, 2001

(65) Prior Publication Data

US 2003/0038210 A1 Feb. 27, 2003

(51) Int. Cl.[7] .............................................. B65H 23/04
(52) U.S. Cl. .................................................. 242/615.2
(58) Field of Search ......................... 242/615.2, 157 R

(56) References Cited

U.S. PATENT DOCUMENTS

| | | | | |
|---|---|---|---|---|
| 2,974,933 A | * | 3/1961 | Belander | 242/615.2 |
| 4,815,645 A | * | 3/1989 | Higgins | 242/615.2 |

* cited by examiner

Primary Examiner—John Q. Nguyen
(74) Attorney, Agent, or Firm—Law Offices of Gary Schnittgrund; Gary Schnittgrund

(57) ABSTRACT

A retractable hose guide for guiding a hose through and around gardens, flowerbeds and other yard emplacements. The retractable hose guide is permanently placed in the ground. It overcomes the problems of being a permanent obstacle in the yard, of being susceptible to damage, of having to be removed after each use, or of presenting a safety hazard. A hose may be moved freely around the yard, being guided by the retractable hose guide, thus avoiding damage either to the hose or to the landscaping. The retractable hose guide is placed in the stored position by pressing on the cover by hand or foot, compressing the spring and allowing the spool to be hidden in the body. The retractable hose guide is secured in place by engaging bayonet tabs into bayonet sockets by a simple twist of the cover by hand or foot.

20 Claims, 2 Drawing Sheets

RETRACTABLE HOSE GUIDE

FIELD OF THE INVENTION

This invention relates to landscape maintenance and more specifically to a retractable device to guide water hoses around fragile flower and vegetable garden areas whose flowers and vegetable plants are susceptible to dragging hose damage.

BACKGROUND OF THE INVENTION

In order to water a lawn or a garden it is common to have a hose connected to a water faucet with the faucet being located at a side of a house. The hose may be connected to a reel assembly to facilitate winding and unwinding of the hose. Typically, the hose is moved from side to side on the ground when watering different parts of the lawn or yard. Gardens and flowerbeds are sometimes located next to the sides of homes and directly near the water faucet to which the hose is connected. If sufficient care is not exercised, the hose, when moved side to side or being retracted by the hose reel assembly, can damage the garden and the flowerbed. Additionally, it is quite frequent for other obstacles, such as houses, offices, and trees may prevent or hinder movement of the hose or to damage the hose itself. Therefore, it is advantageous to guide the hose around such obstacles.

There are several patented devices that protect paint, water or air hoses from entanglement or wedging with the tires of a vehicle, including Podrecca (U.S. Pat. No. 3,984,732), Violette (U.S. Pat. No. 4,836,432), Green, et al., and Pauli (U.S. Pat. No. 5,427,339).

In addition, prior art devices have been proposed to solve the problem of protecting gardens, flowerbeds, and other landscaping from being damaged by water hoses. One such device was invented by McElyea (U.S. Pat. No. 4,452,386), another approach was presented by Remby in 1992 (U.S. Pat. No. 5,158,254), Whitehead proposed a new design (U.S. Pat. No. 5,549,262), as did Anderson (U.S. Pat. No. 5,853,142).

The inventor is unaware of any prior art retractable devices that solve the aesthetic and safety concerns that have been ignored by prior devices and which are addressed by this invention. Prior art devices are stationary and protrude upright several inches above the surface of the ground at all times. Several hose guide devices might be placed around the yard area, creating both safety and aesthetic concerns for home gardeners, professional gardening personnel, residents, guests and customers. Gardeners and customers can easily trip over the protruding art devices suffering serious injury and causing grounds for home and business owners liability. Likewise anyone using the yard and garden area for recreational and relaxation purposes can easily trip and fall over these art devices and cause serious and possible fatal injury. Further, the hose guide itself can be easily damaged. Prior art devices also detract from the beauty of the yard and garden area. In view of this, there is need for a retractable hose guide that obviates both the safety and aesthetic concerns of the prior art devices while serving to protect gardens and flowerbeds from being destroyed or damaged by movement of hoses.

SUMMARY OF THE INVENTION

The retractable hose guide eliminates the safety and aesthetic disadvantages of prior art stationary hose guides that remain permanently staked in the ground in the deployed position, protruding upward above the surface of the earth. The retractable hose guide allows the spool to be stored in the stored position, out of the way, and allows it to be manually placed in the deployed position, above ground, only when actually in use. When in the deployed position the spool of the retractable hose guide is in a position above the ground sufficient to cause engagement with a hose as the hose is moved or dragged around the yard. The retractable hose guide can be stored and can remain below ground level when not in use, obviating the esthetic and safety concerns of other such devices.

The retractable hose guide comprises, in part, a cover, a body, a spool and a stake. The cover is cosmetic, in that when the retractable hose guide is in the stored position, the cover is level with the ground and hides the inner workings and spool. The cover also contains the bayonet tabs that when rotatably engaged keeps the device in the stored position in the ground. The body houses the spool. The stake secures the retractable hose guide in the ground.

The retractable hose guide is placed in the deployed position, above the ground level, by rotating the cover and allowing a spring to place the spool into position. The spool is placed in the stored position within the body and completely below ground level, by manually forcing the cover downward toward the body. The cover is locked in place, flush with ground level, by rotatably engaging the cover by hand or foot. The spool is concealed from view, thus the possibility of the deployed spool tripping a person or of the retractable hose guide being damaged is eliminated.

OBJECTS OF THE INVENTION

It is an object of the present invention to provide a retractable hose guide for guiding a hose in a yard.

It is an object of the present invention is to protect garden and flower beds from inadvertent damage associated with use of a hose.

It is an object of the present invention to provide a retractable hose guide that can withstand temperatures from below freezing to 130° F. or higher.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
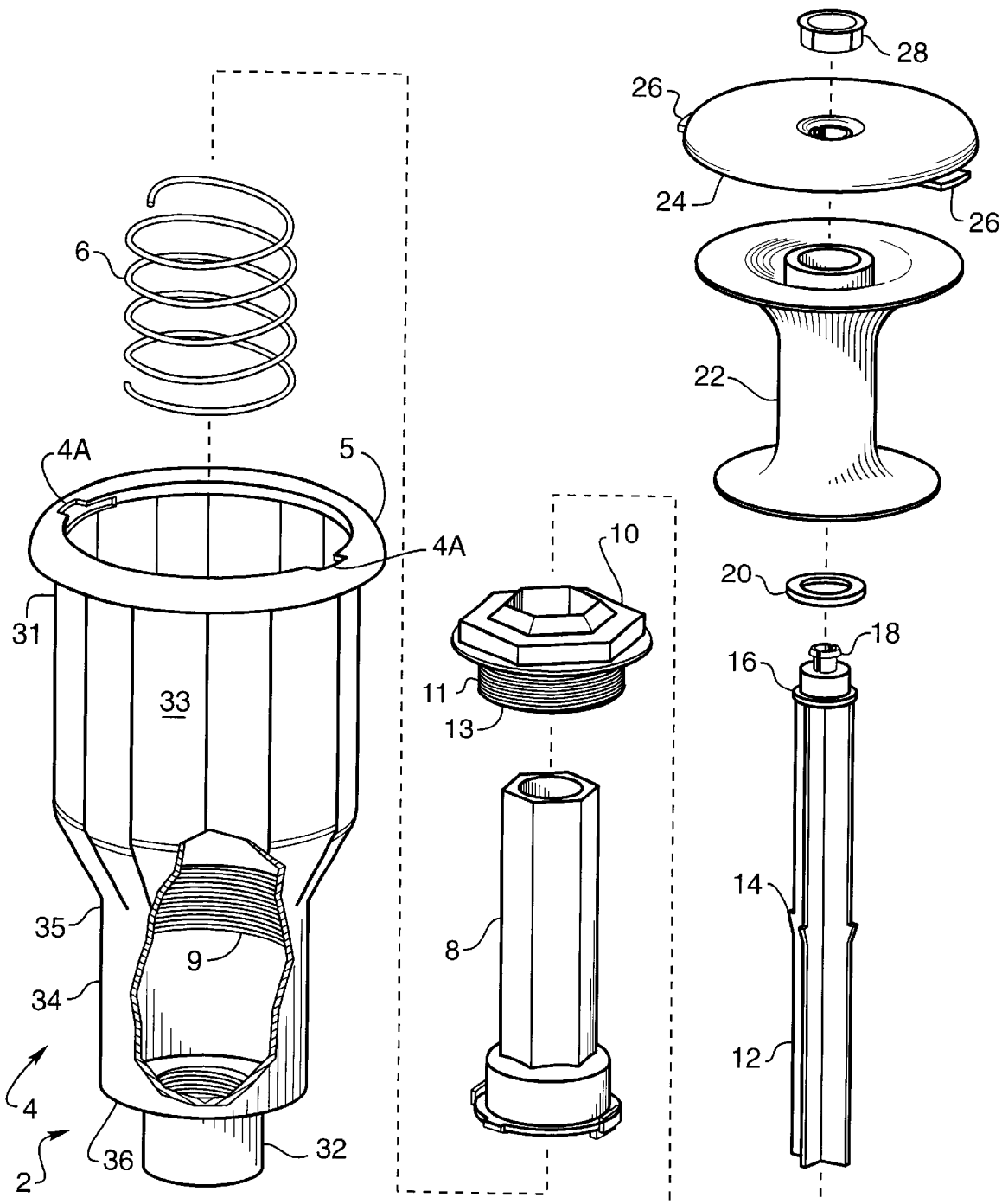
FIG. 1 is an exploded perspective view of a preferred embodiment of the retractable hose guide, components, and assembly according to the present invention.

The retractable hose guide 2 is shown generally in FIG. 1. Body 4 is a dual cylindrical shape generally having a large diameter cylinder portion 33 and a small diameter cylinder portion 34, both of uniform wall thickness. The bottom end 36 of the small diameter cylinder portion 34 is closed while the top end 31 of the large diameter cylinder portion 33 is open. The ends are parallel to each other, each being perpendicular to the collinear longitudinal axis of the cylinders. Stake 32 is firmly attached to the outside of the closed bottom end 36 of small diameter cylinder portion 34, wherein the longitudinal axis of each cylinder portion, i.e., large diameter cylinder portion 33 and small diameter cylinder portion 34, and the longitudinal axis of the stake 32 are collinear. The end of stake 32 opposite the attachment to the bottom end 36 of small diameter cylinder portion 34 is sharp, thereby facilitating placing body 4 into the ground, such that body 4 will not move when subjected to the forces encountered when guiding a hose.

It is preferred that body 4 be made from a high strength, high impact resistant molded plastic that is resistant to the environment, including wet soil, ultraviolet rays of the sun, and temperatures in a range from below freezing to 130° F. or higher. The plastic may be ABS plastic, polyethylene, or polypropylene and in a preferred embodiment, this material is ABS plastic. Body 4 can also be made of corrosion resistant metal, such as aluminum, an alloy of aluminum, or stainless steel.

The top end 31 of the large diameter cylinder portion 33 contains collar 5, which is part of body 4 and which is preferably made of the same material as body 4, wherein there is at least one bayonet socket 4A. In a preferred embodiment, there are at least two bayonet sockets 4A. Each bayonet socket 4A mates with and receives a bayonet tab 26 that is attached to cover 24, to retain cover 24 in the stored position, which is preferably at approximately ground level, when retractable hose guide 2 is in the stored position buried in the ground. When retractable hose guide 2 is buried in the ground, collar 5 is approximately level with the ground and body 4 is completely buried beneath ground level.

Spring 6 is placed inside body 4 such that it rests upright on the inside of the bottom end 36 of small diameter cylinder portion 34. The longitudinal axis of spring 6 is approximately collinear with the axis of body 4. The top of spring 6 contacts the bottom of plunger 8, thereby exerting an upward force on plunger 8 generally causing it to slide in an upwardly direction through threaded guide 10 until the base of plunger 8 contacts the bottom of threaded guide 10, thus stopping the upward movement of plunger 8 when it contacts threaded guide 10.

Threaded guide 10 has a threaded portion 11 on its lower end 13 which mates with the inside diameter 9 threaded hole in the upper end 35 of the small diameter cylinder portion 34. When threaded guide 10 is screwed into the inside diameter 9 of body 4, it retains plunger 8 in body 4. The outer diameter and shape of plunger 8 and the inner hole of threaded guide 10 are generally the same shape and are of approximately the same dimension, so as to allow plunger 8 to slide freely inside threaded guide 10. In a preferred embodiment, plunger 8 is hexagonal in cross-section, although it could also be round, square, or any other shape in cross-section without altering its performance. The longitudinal axis of plunger 8 and the longitudinal axis of threaded guide 10 are collinear with the longitudinal axis of body 4.

The upper end of plunger 8 mates with the lower end of axle 12 such that axle 12 becomes an extension of plunger 8. In the embodiment depicted in FIG. 1, plunger 8 is integrally bonded to axle 12 by bonding axle 12 inside the longitudinal hole in plunger 8. In alternative embodiments, plunger 8 and axle 12 may be formed as one integral component without sacrificing function. Axle 12 is shown in FIG. 1 as having a cross-shaped cross-section, however, axle 12 can also be solid and round without altering its function. The longitudinal axis of axle 12 is collinear with the longitudinal axis of body 4.

Axle 12 contains support boss 14, which retains bearing washer 20, which in turn retains spool 22, keeping spool 22 in the desired position to guide a hose, when in the deployed position.

The upper end of axle 12 contains flange 16 and snap-on stub 18. Flange 16 supports cover 24 on its under side, thus keeping cover 24 from contacting spool 22, thereby allowing spool 22 to freely spin on axle 12. Cover 24 has a center hole through which snap-on stub 18 passes. Snap-on stub 18 mates securely with closure 28, thereby keeping the retractable hose guide 2 together as an assembly.

Figure 2:
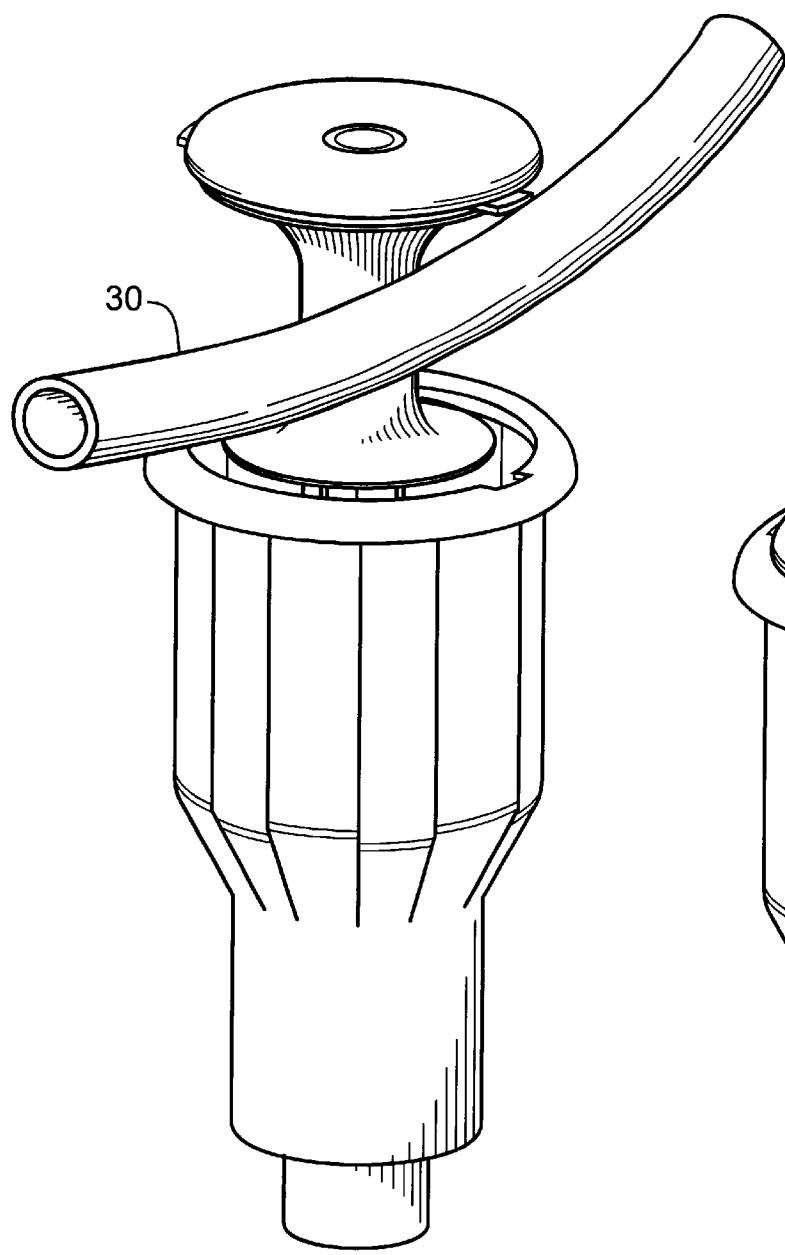
FIG. 2 is a perspective view of the retractable hose guide in the deployed position depicting the interaction of the retractable hose guide with a hose.

Retractable hose guide 2 is shown in FIG. 2 in the in-use deployed position with spool 22 contacting hose 30. Spool 22 is urged vertically upward by compressed spring 6 pushing against the base of plunger 8 thereby placing spool 22 into the deployed position above ground level.

Figure 3:
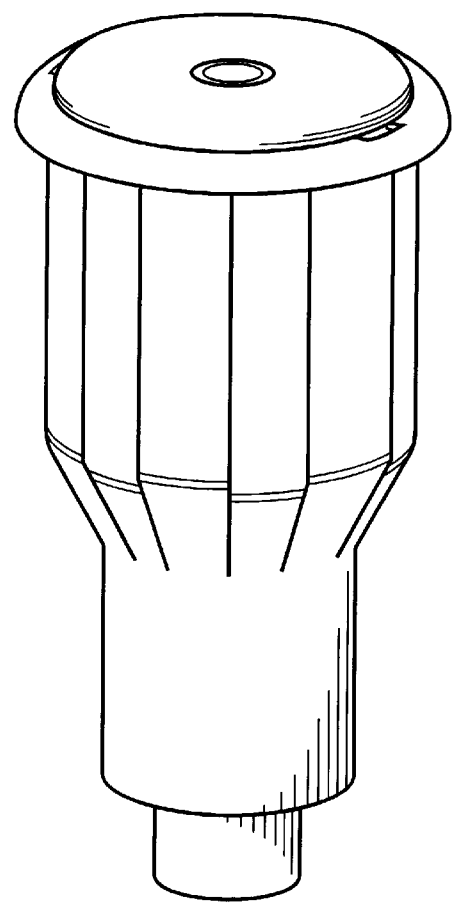
FIG. 3 is a perspective view of the retractable hose guide depicting the hose guide in the stored positions.

The retractable hose guide is shown in FIG. 3 in the stored position. Spool 22 is urged into body 4 by pushing cover 24 towards collar 5. It is retained in the stored position by rotatably engaging bayonet tab 26 into bayonet socket 4A, leaving cover 24 in a locked position. Rotating cover 24, in a direction opposite to that used to engage bayonet tab 26 with bayonet socket 4A, manually by foot or by hand, disengages bayonet tabs 26 from bayonet sockets 4A, freeing spool 22 to move into the deployed position.

It should be further recognized that other combinations of internal components are possible. It is obvious that the instant invention can be combined with a source of water so as to be a combination hose guide and pop-up sprinkler. It is equally obvious that hose 30 can be a water hose, paint hose, garden hose, pneumatic hose, or paint hose.

Although the preferred embodiment of the present invention has been described and depicted hereinabove in terms of its positioning with respect to lawns, gardens or flower beds, it should be recognized that it could be employed in association with other landscape features, such as trees, or in other areas in which movement of the hose may disturb or destroy items within the area or where the hose itself might be damaged.

From all that has been described, it will be clear that there has been shown and described herein a retractable hose guide which fulfills the various objects and advantages sought therefore. It will be apparent to those skilled in the art, however, that many changes, modifications, variations, and other uses and applications of the subject hose-guiding device are possible and contemplated. All changes, modifications, variations, and other uses and applications which do not depart from the spirit and scope of the invention are deemed to be covered by the invention, which is limited only by the claims which follow.

Obviously, many modifications and variations of the present invention are possible in light of the above teachings. It is therefore to be understood that, within the scope of the appended claims, the invention may be practiced otherwise than as specifically described.

Parts List
1
2 Retractable hose guide, generally
3
4 body
4A bayonet socket
5 collar
6 spring (pushes on the bottom of 8)
7
8 plunger (slides within 10)
9 inside diameter (with threads)
10 threaded guide (with rubber seal not designated)
11 threaded portion of threaded guide 10
12 axle (can be solid and round); it is bonded inside plunger 8
13 lower end of threaded guide 10
14 boss (supports 20)
15
16 flange (supports underside of 24)
17
18 snap-on stub (retains 28)
19
20 bearing washer (keeps 22 from sliding off of 12)
21
22 spool
23
24 cover
25
26 bayonet tab
27
28 closure (snap-on)
29
30 garden hose
31 top end (of body 4)
32 stake
33 large diameter cylinder portion (of body 4)
34 small diameter cylinder portion (of body 4)
35 upper end (of small diameter cylinder 34)
36 bottom end (of small diameter cylinder 34)
37
38
39
40
41
42
43

What is claimed is:

1. A retractable hose guide comprising:
   a body connected by threads to a threaded guide wherein a plunger slides within said threaded guide between a stored position and a deployed position, said plunger connected to an axle,
   said body having a top end which contains at least one bayonet socket for receiving a bayonet tab that is attached to a cover for retaining said cover in said stored position,
   a spool for guiding a hose, said spool rotatably mounted on said axle,
   means for placing said spool in said deployed position, and
   means for retaining said spool in said stored position.

2. The retractable hose guide according to claim 1 wherein said body is made from a plastic.

3. The retractable hose guide according to claim 2 wherein said plastic is ABS plastic.

4. The retractable hose guide according to claim 1 wherein said body is made from a corrosion resistant metal.

5. The retractable hose guide according to claim 4 wherein said corrosion resistant metal is selected from the group comprising aluminum, an alloy of aluminum, or stainless steel.

6. The retractable hose guide according to claim 1 wherein said body is cylindrical having said top end and a bottom end, said top end being parallel to said bottom end.

7. The retractable hose guide according to claim 1 wherein said means for placing said spool in said deployed position is a spring that is contained in said body.

8. The retractable hose guide according to claim 1 having means for fixing said retractable hose guide in a stable position in the ground.

9. The retractable hose guide according to claim 8 wherein, said means for fixing said retractable hose guide in a stable position in the ground is a stake that is fixedly attached to a bottom end of said body.

10. A retractable hose guide comprising:
    a body having an inside diameter with threads for threaded connection to a threaded guide, said threaded guide having an outside diameter having threads on said outside diameter, wherein a plunger slides within said threaded guide, said plunger connected to an axle,
    a spool for guiding a hose, the spool rotatably mounted on said axle,
    a cover mounted on said axle which is retained by a closure wherein said closure is suitable to snap onto a snap-on stub which is on the end of said axle, thereby retaining said cover and said spool on said axle,
    a boss on said axle against which a bearing washer sits which keeps said spool from moving along said axle to said threaded guide,
    means for placing said spool in a deployed position, and
    at least one bayonet tab that is attached to said cover, said at least one bayonet tab being rotatably engageable with at least one bayonet socket on said body to retain said spool in a stored position, the number of bayonet sockets being equal to the number of bayonet tabs.

11. The retractable hose guide according to claim 10 wherein said means for placing said spool in a deployed position is a spring.

12. A retractable hose guide comprising:
    a body connected by threads to a threaded guide wherein a plunger slides within said threaded guide between a stored position and a deployed position, said plunger connected to an axle,
    said body having a top end which contains at least one bayonet socket for receiving a bayonet tab that is attached to a cover for retaining said cover in said stored position,
    a spool that is rotatably mounted on said axle,
    means for placing said spool in said deployed position, and
    said bayonet tab on said cover for engaging said bayonet socket in a collar, rotating said cover to put said bayonet tab under said collar.

13. The retractable hose guide according to claim 12 wherein said means for placing said spool in said deployed position is a spring.

14. The retractable hose guide according to claim 12 having a means for fixing said retractable hose guide in a stable position in the ground.

15. The retractable hose guide according to claim 14 wherein said means for fixing said retractable hose guide in a stable position in the ground is a stake that is fixedly attached to the bottom of said body.

16. The retractable hose guide according to claim 12 wherein said body is made from a plastic.

17. The retractable hose guide according to claim 16 wherein said plastic is ABS plastic.

18. The retractable hose guide according to claim 12 wherein said body is made from a corrosion resistant metal.

19. The retractable hose guide according to claim 18 wherein said corrosion resistant metal is selected from the group comprising aluminum, an alloy of aluminum, or stainless steel.

20. The retractable hose guide according to claim 12 wherein said body is cylindrical having an a top end and an a bottom end, said top end being parallel to said bottom end.

* * * * *